United States Patent [19]

Riti

[11] 3,997,184
[45] Dec. 14, 1976

[54] BICYCLE REFLECTIVE SURFACE

[75] Inventor: Alfred Riti, Yonkers, N.Y.

[73] Assignee: Lawrence Peska Associates, Inc., New York, N.Y. ; a part interest

[22] Filed: June 13, 1975

[21] Appl. No.: 586,597

[52] U.S. Cl. .................. 280/289 R; 40/129 C; 116/28 R
[51] Int. Cl.² .............................. B62J 5/20
[58] Field of Search ............ 280/289; 350/97, 103; 40/129 C; 116/28 R

[56] References Cited

UNITED STATES PATENTS

| | | | |
|---|---|---|---|
| 3,690,721 | 9/1972 | Herbert | 280/289 X |
| 3,768,433 | 10/1973 | Dian | 116/28 R |
| 3,894,790 | 7/1975 | Golden | 350/97 X |

FOREIGN PATENTS OR APPLICATIONS 147,645  6/1931  Switzerland ................ 280/289

OTHER PUBLICATIONS

American Bicyclist, Apr. 1943, p. 8, Schwinn Advertisement.

*Primary Examiner*—M. H. Wood, Jr.
*Assistant Examiner*—Terrance L. Siemens
*Attorney, Agent, or Firm*—Richard E. Nanfeldt

[57] ABSTRACT

A reflective surface for positioning on the frame of a bicycle has at least two sides thereof positioned in closely spaced relationship to the sides of the bicycle frame. The generally planar member is luminescent and has a pattern disposed thereon to further improve its visibility.

4 Claims, 5 Drawing Figures

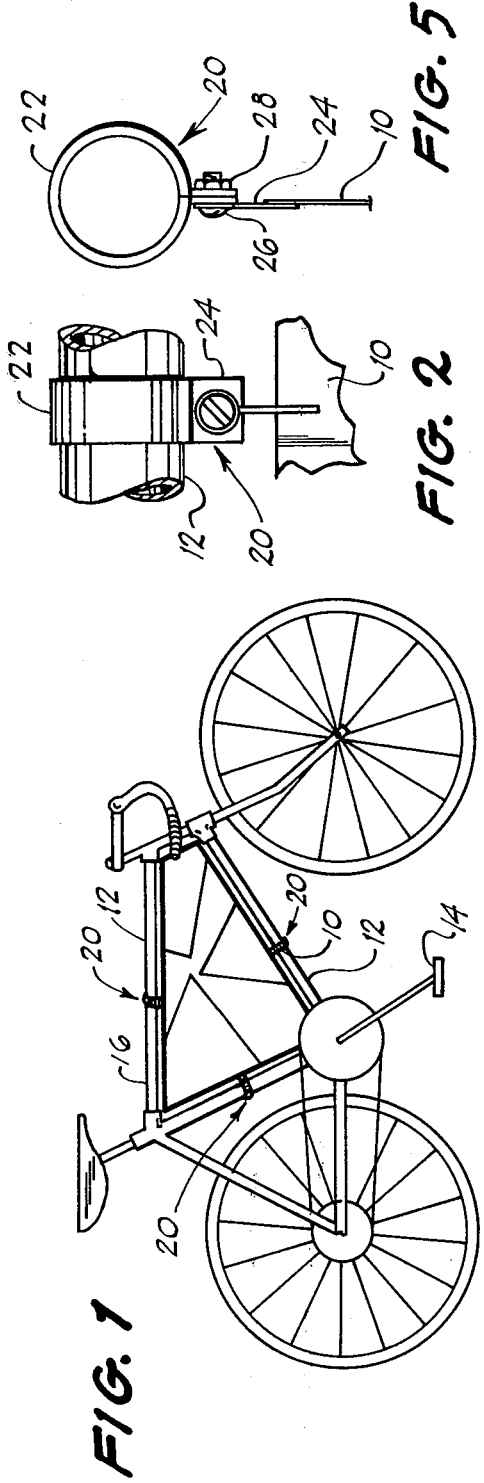
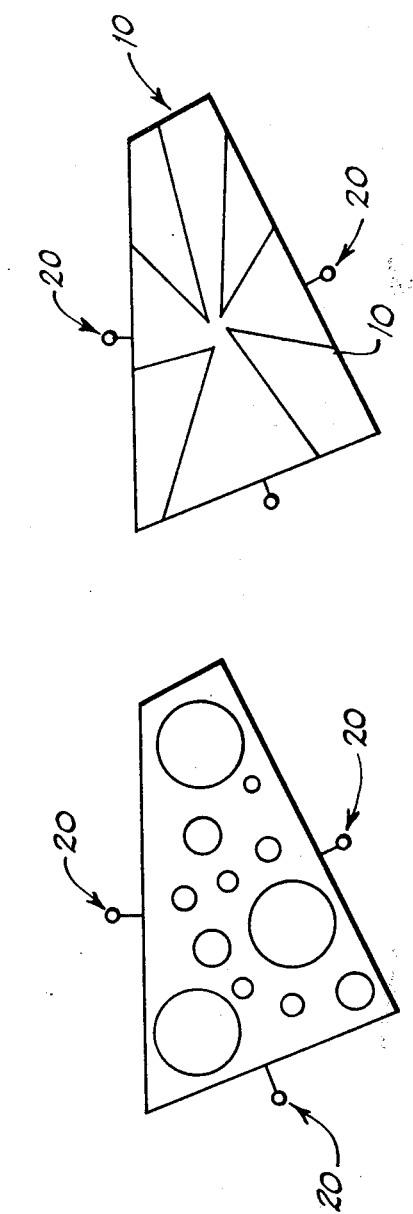

3,997,184

BICYCLE REFLECTIVE SURFACE

BACKGROUND OF THE INVENTION

The invention relates to bicycle and particularly to reflective therefor adapted to warning other vehicles of the presence of the bicycle. The prior art includes various apparatus which is intended to warn other vehicles of the presence of a bicycle particularly in darkness or dim light conditions. These include reflective pedals, reflectors positioned on wheels and reflectors placed on fenders. Despite the use of such reflective surfaces there continues to be a large number of accidents involving bicycles and other vehicles, particularly motor cycles and automobiles. In part these accidents result from drivers who are inattentive and do not anticipate the presence of bicycles along roadways where they primarily encounter other motor vehicles. Frequently the accidents occur in daylight hours as well as in twilight and darkness.

It is a primary object of the invention to provide apparatus which will substantially increase the visibility by a bicycle in all lighting conditions.

It is another object of the invention to provide apparatus which is easy to install on existing bicycles without modification of any of the basic structural elements thereof.

Yet another object of the invention is to provide such apparatus which is simple and inexpensive to manufacture.

SUMMARY OF THE INVENTION

It has now been found that these and other objects of the invention may be attained by an attachment for a bicycle having a frame utilizing intersecting structual members. A reflective device is provided which is generally planar and has at least portions thereof contoured for closely spaced relationship to at least two intersecting members of the frame. A plurality of brackets engage the frame and the generally planar member to firmly position the generally planar member in closely spaced relationship to the frame members.

Normally the generally planar member will be manufactured of a phosphorescent material and for those applications utilizing a bicycle frame having a generally horizontal upper bar the member normally will be four sided and have all four sides in closely spaced relation to the frame members. Ordinarily a design will be disposed on the generally planar member to further enhance the visibility thereof.

BRIEF DESCRIPTION OF THE DRAWING

The invention will be better understood by reference to the accompanying drawing in which:

FIG. 1 is a side elevational view of bicycle incorporating one form of the invention;

FIG. 2 is a broken away view to an enlarged scale of a bracket in accordance with the embodiment shown in FIG. 1;

FIG. 3 is a side elevational view of another embodiment of the invention;

FIG. 4 is a side elevational view to an enlarged scale of the apparatus shown in FIG. 1; and FIG. 5 is an end elevational view of the brackets shown in FIG. 2.

DESCRIPTION OF THE PREFERRED EMBODIMENT

Referring now to FIGS. 1, 2, 4 and 5 there is shown a generally planar member 10 having the outline thereof configured for closely spaced positioning within a bicycle frame 12. Various patterns may be provided on the generally trapezoidally planar member 10 such as those abstract patterns shown in FIGS. 3 and 4. It will be apparent that visibility of the bicycle will be considerably enhanced by the use of the patterns on the generally planar member 10 particularly when exposed to light and the bicycle rider's leg cyclically covers a portion of the generally planar member as the pedal 14 is rotated in its circular path. In those bicycle constructions which do not utilize the generally horizontal top member 16 it will be understood that the generally planar member will be provided with either a cut out for accommodation of the legs of the user or alternatively will extend vertically approximately half of the distance between the pedals and the top of the frame.

Along at least some of the sides of the generally planar member 10 will be disposed brackets 20 which will have an arcuate section 22 for engagement with the frame 12 of the bicycle and an elongated generally planar member 24 disposed for engagement with the generally planar member 10. Ordinarily at least one screw 26 and nut 28 will be provided for firm engagement therebetween. The material of the arcuate section 22 may be metal or nylon or other suitable material including rubber backing around a steel core to avoid damage to the frame of the bicycle.

Referring to FIG. 4 there is shown another embodiment of the invention which is similar to that shown in FIG. 1 and which differs merely in the abstract pattern which is disposed on the generally planar member 10. As is apparent from the drawing the pattern may be created by variations in color of the various sections. In other forms of the invention sections of the generally planar member may be removed to create an aesthetically appealing pattern. Ordinarily it is preferable to merely provide an abstract pattern without reducing the total area of the reflective surface which in the preferred form is manufactured of a phosphorescent color by utilizing the entire area available within the limits of the frame. This will contribute to greater visibility.

Having thus described my invention, I claim:

1. An attachment for a bicycle having a frame of intersecting structural members including a top horizontal bar, a downwardly extending seat bar, an upwardly extending bar connecting said seat bar to a forward wheel steering bar, which comprises:
   a. at least three generally planar reflective members, each said member of a generally trapezoidal configuration; and
   b. two bracket members affixed to each said reflective member, one said bracket affixed to one side of said reflective member, another said bracket affixed to another side of said reflective member, said another side being next to one said side of said reflective member, each said bracket having an arcuate section and an elongated generally planar member, said generally planar member affixed to said side of said reflective member by screw and nut means, said brackets of said first reflective member engaging said top horizontal bar and said seat bar, said brackets of said second reflective member engaging said top horizontal bar and said forward wheel steering bar, said brackets of said third reflective memers engaging said upwardly extending bar, said first, second, and third reflective members extending inwardly into an opening defined by said seat bar, said wheel bar, said upwardly extending bar, and said top horizontal bar.

2. The apparatus as described in claim 1 wherein said generally planar member is provided with a phosphorescent coating.

3. The apparatus as described in claim 1 wherein said generally planar member has a plurality of openings therein, said openings contributing to increased visibility thereof by creating an abstract pattern.

4. The apparatus as described in claim 1 wherein said generally planar member has an abstract pattern disposed thereon.

* * * * *